United States Patent [19]

Swank et al.

[11] Patent Number: 5,497,806

[45] Date of Patent: Mar. 12, 1996

[54] COMPACT PIN-WITHIN-A-SLEEVE THREE-WAY VALVE

[75] Inventors: Bryan W. Swank; Arpad M. Pataki, both of Columbus, Ind.; Bela Doszpoly, Budapest, Hungary; Mark S. Cavanagh, Columbus, Ind.; John D. Lane, Columbus, Ind.; Kent V. Shields, Columbus, Ind.; Philip J. G. Dingle, Rochester, Mich.

[73] Assignees: Cummins Engine Company, Inc., Columbus, Ohio; Lucas Industries PLC, West Midlands, England

[21] Appl. No.: 293,935

[22] Filed: Aug. 22, 1994

Related U.S. Application Data

[63] Continuation of Ser. No. 41,424, Mar. 31, 1993, abandoned.

[51] Int. Cl.[6] .......................... F15B 13/044; F16K 11/00
[52] U.S. Cl. .................. 137/625.65; 137/625.25; 251/129.07
[58] Field of Search .................. 137/625.25, 625.65; 251/129.07

[56] References Cited

U.S. PATENT DOCUMENTS

| 820,178 | 5/1906 | Buerkle ........................ 137/625.26 |
|---|---|---|
| 1,436,768 | 11/1922 | Mackie et al. . |
| 3,016,917 | 1/1962 | Hunt . |
| 3,151,624 | 10/1964 | Koutnik . |
| 3,680,782 | 8/1972 | Monpetit et al. . |
| 3,800,832 | 4/1974 | Umphenour et al. ........... 137/625.65 |
| 4,176,822 | 12/1979 | Chadwick . |
| 4,561,468 | 12/1985 | Kreitchman et al. . |
| 4,582,294 | 4/1986 | Fargo . |
| 4,598,736 | 7/1986 | Chorkey . |
| 5,038,826 | 8/1991 | Kabai et al. . |
| 5,396,926 | 3/1995 | Pataki et al. ................... 137/625.65 |

FOREIGN PATENT DOCUMENTS 64-69876  3/1989  Japan .

Primary Examiner—Gerald A. Michalsky
Attorney, Agent, or Firm—Sixby, Friedman, Leedom & Ferguson

[57] ABSTRACT

A three-way valve including a valve housing having a valve chamber and a high pressure fluid supply inlet, high pressure fluid outlet and drain communicating with the valve chamber is disclosed. A movable member is reciprocally received in the valve chamber so as to be reciprocated between first and second positions for selectively fluidically communicating the outlet with either the inlet or drain. A first valve seat is formed in the valve housing and concentrically disposed in the valve chamber for sealing communication between the outlet and drain and a second valve seat is concentrically disposed in a cavity formed in the movable member for sealing communication between the inlet and outlet. A floating pin is received in the movable valve member cavity at a one end of the movable valve member and cooperates with the second valve seat for selectively sealing fluidic communication between the inlet and the outlet. An actuating device is mounted on the valve housing adjacent an end of the movable valve member opposite the floating pin for advancing the movable valve member toward the first position when energized and for allowing the movable valve member to retract to the second position when de-energized.

5 Claims, 2 Drawing Sheets

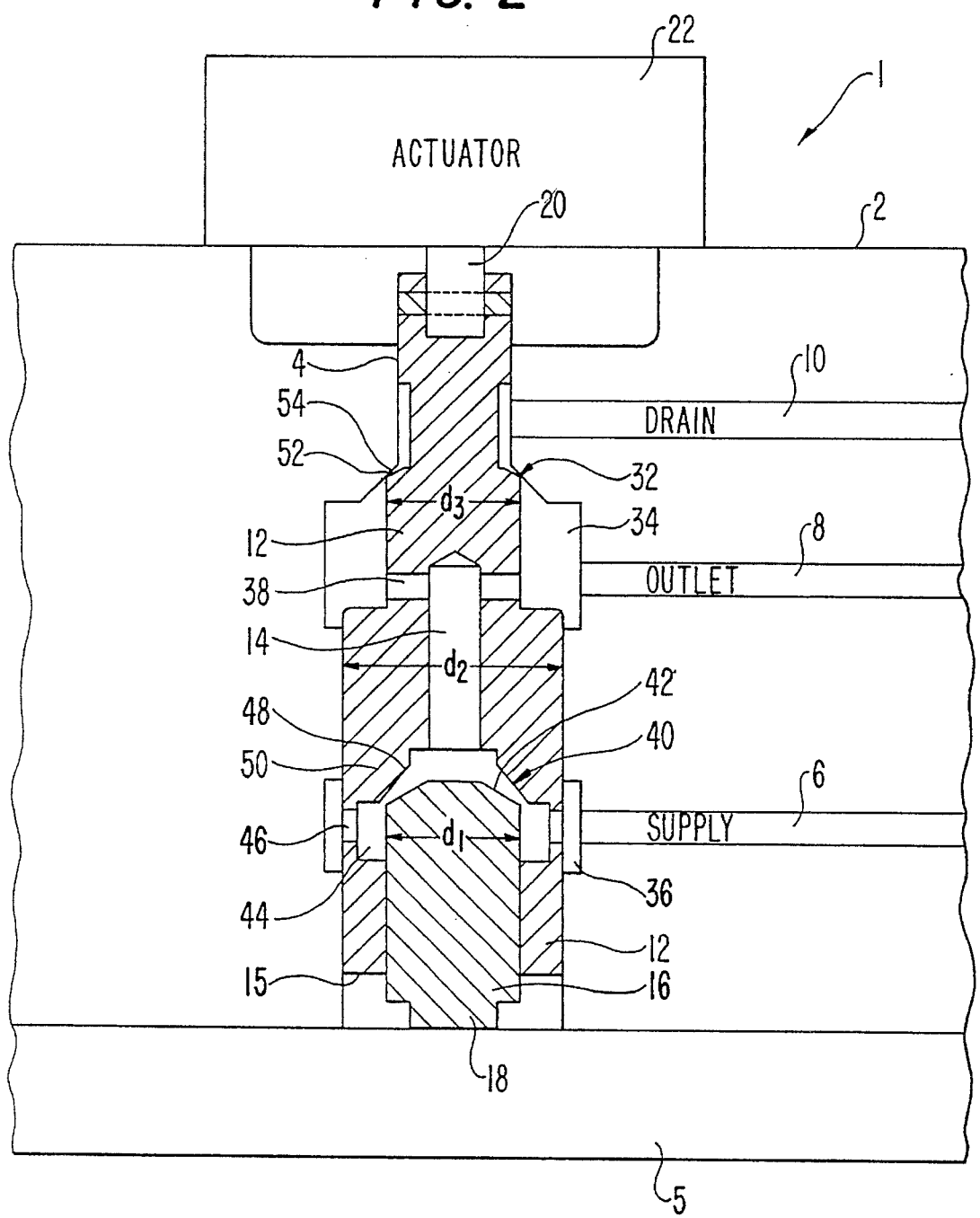

COMPACT PIN-WITHIN-A-SLEEVE THREE-WAY VALVE

This application is a Continuation of Ser. No. 08/041,424, filed Mar. 31, 1993, now abandoned.

BACKGROUND OF THE INVENTION

1. Technical Field

The present invention is directed to a three-way valve adapted to selectively control the flow of fluid between a fluid supply, a load device and a drain.

2. Background Art

Three-way valves have long been used for controlling fluid flow in a variety of air and hydraulic systems, particularly fuel systems. Such three-way valves often control the passage of fluid under high pressure from a source to a load device and selectively interrupt the flow of pressurized fluid while simultaneously connecting the load device to a substantially unpressurized drain. Typically, a three-way valve includes a valve housing having first, second and third valve passages interconnected by an internal valve chamber containing two valve seats and a valve member movable by an actuating device connected to the movable valve member to control fluid flow among the three valve passages by moving between (1) a first position in which the movable valve member engages a first one of the valve seats to isolate a first one of the valve passages from the internal chamber while allowing fluid communication between the second and third valve passages through the second valve seat and internal chamber, and (2) a second position in which the movable valve member engages the second valve seat to isolate a second one of the valve passage while allowing fluid communication between the first and third valve passages through the first valve seat and internal chamber.

As is well recognized, both valve manufacturers and designers of components incorporating valve assemblies continually strive to minimize the size, weight and cost of valve assemblies while maintaining the high operating requirements demanded for controlling the flow of very high pressure fluids. Thus, the above-discussed three-way valve assembly requires a valve assembly including an actuator assembly, a movable valve member and a floating pin which are operatively positioned relative to one another to minimize the size and weight of both the actuator assembly and the entire valve assembly while permitting a simple connection between the actuator and the valve element. Also, it is important to design a valve assembly capable of being operated by a conventional, "off-the-shelf" actuator assembly thereby eliminating the costs involved in procuring a specially designed actuator assembly.

A known type of three-way valve is the "pin-within-a-sleeve" design. For example, both U.S. Pat. Nos. 3,689,782 issued to Monpetit and 5,038,826 issued to Kabai et at. disclose a "pin within a sleeve" type three-way valve using a high speed solenoid actuator which provides fast response time and the ability to handle very high fluid pressures. These valves include a hollow movable valve member having a floating inner pin telescopingly received within the hollow movable valve member. In an advanced position, the hollow movable valve member is biased into engagement with a first valve seat formed in the surrounding valve housing and engaged by of the movable valve member. In a solenoid retracted position, the movable valve member is biased against the floating inner pin to open the first valve seat and close a second valve seat located within the hollow movable valve member and positioned to be engaged by one end of the floating inner pin. While the "pin-within-a-sleeve" offers fast response time and the ability to handle very high pressures, certain design problems remain unsolved.

For example, in the Monpetit and Kabai valves, as with most three-way valves, the actuating device, i.e. a solenoid assembly, used to initiate the movement of the movable valve member between the first and second positions, is mounted on the valve housing adjacent, and operatively connected, to one end of the movable valve member. In addition, the floating pin is positioned in the valve cavity formed in the movable valve member immediately adjacent the same end of the movable valve member as the actuating device. The positioning of the pin on the same side of the movable valve member as the actuating device both complicates the connection of the movable valve member to the actuating device and increases the size of the actuating device. For example, when a solenoid actuator is used, the armature of the solenoid must be sized to fit around both the pin and movable valve member. Moreover, since the pin acts as a valve seat which is impacted by the movable valve member, hundreds of times per minute in many applications, the pin must be sufficiently supported by a rigid body capable of withstanding these conditions. However, in the Mortpetit and Kabai valves, the solenoid assembly housing supports the pin therefore requiring more attention to be given to the design of the solenoid housing possibly resulting in a larger, heavier more expensive actuator.

The disadvantages associated with positioning the floating pin between the movable valve member and actuating assembly are exacerbated in other valve designs which require other valve components such as adjustable stops for the floating pin to be positioned adjacent the actuating assembly.

Therefore, there exists a need for a "pin-within-a-sleeve" type three-way valve having a floating pin located on the side of valve opposite the actuating assembly.

SUMMARY OF THE INVENTION

It is one object of the present invention to provide a three-way valve assembly which overcomes the aforementioned shortcomings associated with known prior art three-way valves.

Another object of the present invention is to provide a "pin-within-a-sleeve" type three-way valve assembly including an actuating device which is compact and inexpensive to manufacture yet still offering fast response time and the ability to handle very high fluid pressures.

A further object of the present invention is to provide a "pin-within-a-sleeve" type three-way valve assembly including an actuating device wherein the actuating device is a conventional "off-the-shelf" actuator.

Yet another object of the present invention is to provide a "pin-within-a-sleeve" type three-way valve assembly including an actuator device which simplifies the packaging arrangement by minimizing the number of valve components located between the valve and the actuator device.

Still another object of the present invention is to provide a "pin-within-a-sleeve" type three-way valve assembly including an actuator device which maximizes the space available for the connection of the actuator to the valve while providing a compact assembly.

These as well as additional objects of the present invention are achieved by providing a "pin-within-a-sleeve" three-way valve assembly including a valve housing having a valve chamber and a supply passage adapted to be externally connected to a high pressure fluid supply passage, an outlet passage adapted to be connected to an external device such as a fuel injector nozzle and a drain passage adapted to be connected with a low pressure drain wherein the valve passages are all fluidically connected to the valve chamber. A movable valve member is reciprocally received in the valve chamber for movement between first and second positions and contains a cavity at one end. A floating pin is received in the movable valve member cavity at a one end of the movable valve member and cooperates with the second valve seat for selectively sealing fluidic communication between the inlet and the outlet. A first valve seat is formed in the valve housing and concentrically disposed in the valve chamber to engage the movable valve member in its first position to isolate the drain passage from the outlet passage and the supply passage while permitting communication between the supply passage and outlet passage. A second valve seat is concentrically disposed in a cavity in the movable valve member to engage one end of the floating pin to isolate the supply passage from the outlet passage and the drain passage while permitting communication between the outlet passage and the drain passage. An actuating device is mounted on the valve housing adjacent an end of the movable valve member opposite the floating pin for advancing the movable valve member toward the second position when energized and for allowing the movable valve member to retract to the second position when de-energized.

BRIEF DESCRIPTION OF THE DRAWINGS

FIG. 2 is a cross-sectional view of the three-way valve in accordance with the preferred embodiment of the present invention in the fully opened and energized state.

DETAILED DESCRIPTION OF THE INVENTION

Figure 1:
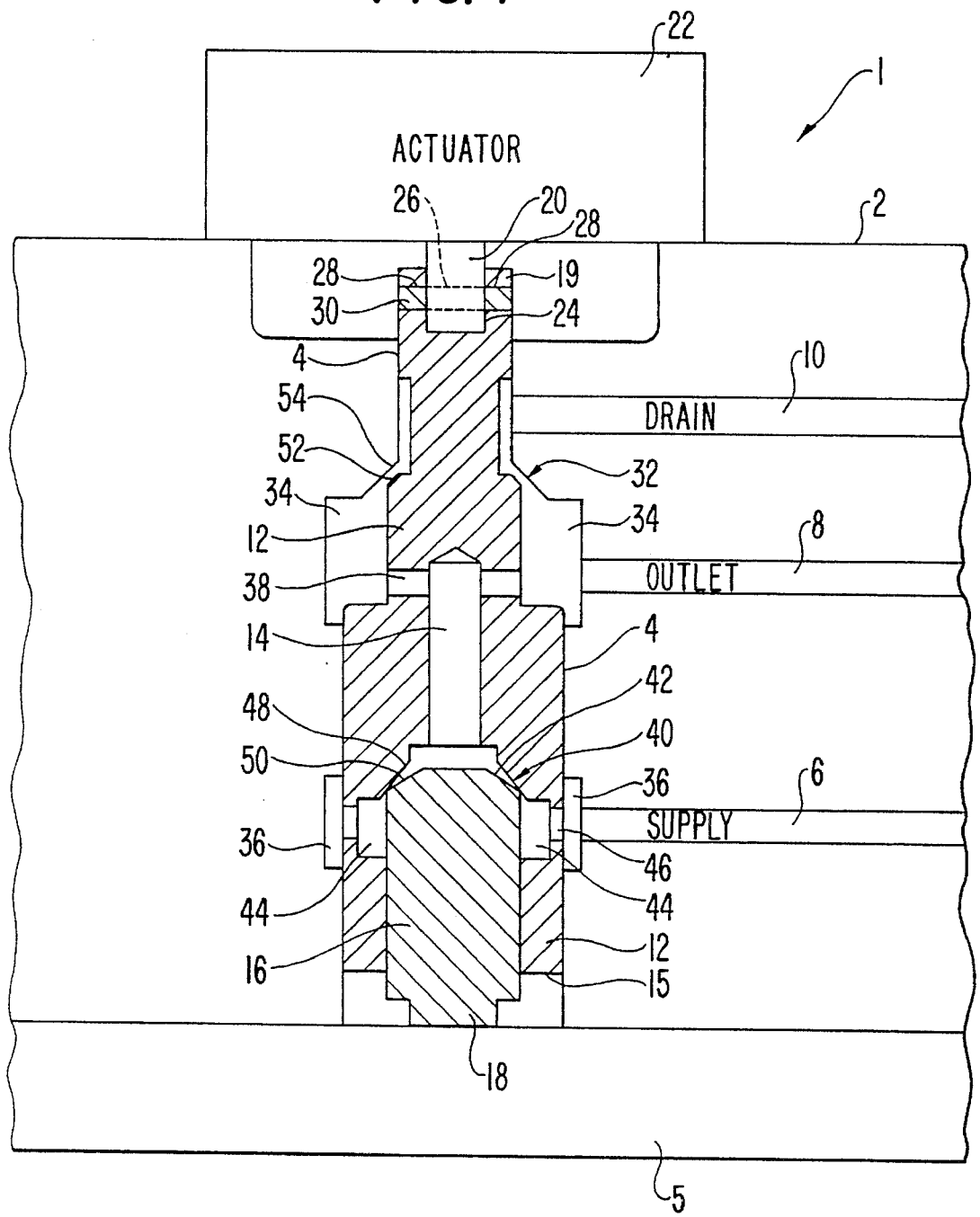
FIG. 1 is a cross-sectional view of a three-way valve in accordance with the preferred embodiment of the present invention in the closed and de-energized state.

Referring to FIGS. 1 and 2, the three-way valve assembly in accordance with the preferred embodiment of the present invention is illustrated. This valve design is particularly suited for application as an injection control valve used in a compression ignition internal combustion engine wherein desirable fuel injection pressures in excess of 20,000 psi may be required. The three-way solenoid valve 1 includes a valve housing 2 which includes a valve chamber 4 in the form of a central bore extending the entire length of the housing. A bottom plate 5 is connected to valve housing 2 to fluidically seal one end of valve chamber 4. Valve housing 2 also includes fluid communication valve passages 6, 8 and 10, fluidically communicating with the valve chamber 4. Valve passage 6 is a high pressure fluid supply passage and may be connected with a source of high pressure fuel for an internal combustion engine. Such pressures are highly desirable in order to achieve high engine efficiency and low emissions. Controlling fluids under such high pressure is difficult in any circumstances but is particularly difficult in the case of fuel injection systems since the timing and quantity of fuel must be very precisely controlled in synchronism with engine operation. The present invention provides a three way valve which is stilted to control the supply of fuel to the individual cylinders of an internal combustion engine but may be used in any environment or for any purpose requiting fluid control under conditions of high pressure, high speed and precise control.

Valve passage 8 may be connected to supply pressurized fluid to a load device such as a hydraulic cylinder, fuel injection nozzle or the like. As will be explained in greater detail below, valve passage 10 is a drain passage for returning fluid to a fluid supply (not shown).

Reciprocally positioned within the valve chamber 4 is a movable valve member 12 which is adapted to reciprocate between first and second positions to control fluid communication among valve passages 6, 8 and 10. Movable valve member 12 is sized to form a close sliding fit with the inside surface of valve chamber 4 creating a fluid seal between the adjacent surfaces to minimize fluid leakage from the supply. Movable valve member 12 contains a cavity 14 formed to open into a lower end 15 of movable valve member 12. Received in cavity 14 in a lower portion of the movable valve member 12 adjacent lower end 15 is a free or floating pin 16 sized to form a close sliding fit with the inside surface of valve dose sliding member cavity 14 creating a fluid seal which minimizes fluid leakage from the clearance between the pin 16 and movable valve member 12. An end portion 18 of floating pin 16 abuts bottom plate 5 which functions as a retraction stop providing a lower limit for the positioning of the floating pin 16 within cavity 14 of movable valve member 12 and thus a lower limit for the movement of movable valve member 12 in valve chamber 4.

An upper end 19 of the movable valve member 12 is secured to a reciprocable arm 20 of an actuator 22 which is operable to pull upwardly on reciprocable arm 20, in the position shown in FIG. 1, to move movable valve member 12 into the position shown in FIG. 2. Actuator 22 may be of the electromagnetic solenoid type wherein reciprocable arm 20 is connected to an armature positioned adjacent a stator. Arm 20 is received in a recess 24 formed in upper end 19 of movable valve member 12 and includes a transverse aperture 26. A pair of aligned apertures 28 formed in upper end 19 diametrically opposite one another on opposite sides of recess 24 align with aperture 26 of arm 20 for receiving a connector pin 30 for securing arm 20 to upper end 19.

Forming a portion of the housing between the outlet valve passage 8 and drain valve passage 10 is a valve seat 32 which when in contact with the movable valve member 12 forms a seal between a first outer annular recess 34 and drain passage 10 to isolate drain passage 10 from the remaining valve passages 6 and 8. As will be explained in greater detail, valve passages 6 and 8 are fluidically connected when the movable valve member 12 is positioned as illustrated in FIG. 2. First outer annular recess 34 is formed in valve housing 2 and axially positioned adjacent valve seat 32 to communicate with valve chamber 4. Housing 2 also contains a second outer annular recess 36 in fluid communication with supply passage 6. Further, a first radial passage 38 is formed in the movable valve member in order to fluidically connect the first outer annular recess 34 with the movable valve member cavity 14 of the movable valve member 12. Additionally, formed in cavity 14 of the movable valve member 12 is a valve seat 40 which cooperams with an upper surface 42 of the floating pin 16 in order to seal fluidic communication between an inner annular recess 44 formed in the movable valve member 12 and the first outer annular recess 34 and consequently the outlet passage 8. Pressurized fluid from the high pressure fluid supply passage 6 is received in the inner annular recess 44 by way of a second radial passage 46. Movable valve member 12 has a sufficiently close sliding fit with the inside surface of the valve chamber 4 to form a fluid seal along substantially the entire length of the movable valve member 12 extending between the first and second outer annular recesses 34 and 36. The seal forming close fit extends below the second outer annular recess 36 to seal recess 36 against fluid leakage between the valve housing 2 and the movable valve member 12.

The three-way valve 1 of FIG. 1 is illustrated in a de-energized state wherein the movable valve member 12 is positioned against floating pin 16 so that upper surface 42 engages valve seat 40. Movable valve member 12 may be biased against floating pin 16 by means of a biasing spring (not illustrated). As can be seen from FIG. 1, the valve seat 40 in the movable valve member 12 includes a frusto-conical surface 48. This surface is concentric about the central axis of movable valve member cavity 14. Moreover, the upper surface 42 of the floating pin 16 includes a frusto-conical portion 50 with the angle of inclination with respect to the central axis of cavity 14 of the frusto-conical portion 50 of the floating pin 16 being less than that of the angle of inclination of the frusto-conical surface 48. In doing so, a circular line of contact is formed between the outer edge of frusto-conical portion 50 of the floating pin 16 and the frusto-conical surface 48 to readily form a seal therebetween. Providing such contact between the floating pin 16 and the movable valve member 12 at the valve seat 40 results in a significant reduction in the requisite machining tolerances as compared to that of valve seats which require the frusto-conical surface 48 and frusto-conical portion 50 to be of identical inclinations. Moreover, the almost line-of-contact seal between the floating pin 16 and movable valve member 12 aids in the separation of the floating pin 16 and movable valve member 12 during operation of the valve 1 and insures that the effective seal area has a highly predictable magnitude which is important in balancing the fluid forces on movable valve member 12.

Referring now to each of FIGS. 1 and 2, the operation of the three-way valve 1 will be set forth hereinbelow in greater detail.

As illustrated in FIG. 1, in the de-energized state, actuator 22 is de-energized thereby allowing movable valve member 12 to move downwardly away from actuator 22 in response to a biasing force such as imposed by a spring (not illustrated). Downward movement of floating pin 16 is arrested by the bottom plate or retraction stop 5. The upper surface 42 of floating pin 16 is seated in the valve seat 40, thus isolating the high pressure fluid supply passage 6 from outlet passage 8 and drain passage 10. Further, the movable valve member 12 is spaced away from the valve seat 32, thus permitting fluidic communication between outlet passage 8 and drain passage 10 through the first outer annular recess 34.

Referring now to FIG. 2, when actuator 22 is energized, the arm 20 is drawn upwardly toward the actuator 22, consequently advancing the movable valve member 12 in an upward direction. As a result, upper surface 42 of the floating pin 16 separates valve seat 40 of the movable valve member 12. Once separated, the supply of pressurized fluid passing through the passage between the valve seat 40 and the upper surface 42 of the floating pin 16 will act downwardly on floating pin 16 maintaining end portion 18 of floating pin 16 in abutment with the retraction stop 5. Continued movement of the movable valve member 12 in an upward direction results in the seating of the movable valve member 12 in valve seat 32. Consequently, drain passage 10 is fluidically sealed from valve passages 6 and 8 while supply passage 6 is fluidically connected to outlet passage 8 to provide high pressure fluid to the load device (not shown) connected downstream of outlet passage 8.

Similar to the valve seat 40, the valve seat 32 includes a frusto-conical surface 52 formed on movable valve member 12 which is of an incline with respect to the horizontal that is less than the incline of a frusto-conical surface 54 formed on the housing 2. Again, as with the sealing surface of valve seat 40, a sharp contacting edge is concentrically formed about the movable valve member 12 which readily contacts the frusto-conical surface 54 of the valve seat 32. This arrangement of engaging conical surfaces insures that the circular line of contact seal, formed by engagement of frusto-conical surfaces 52 and 54 will have the same diameter as the outer shoulder of the movable valve member 12.

As shown in FIG. 2, movable valve member 12 can be force balanced in the energized state or position by dimensioning the valve such that a) the diameter $d_3$ of valve seat 32 equals the diameter $d_1$ of valve seat 40 and b) the area created by the diameter $d_3$ equals the area created by the diameter $d_2$ minus the area created by diameter $d_3$.

As illustrated in FIG. 1, floating pin 16 is positioned at one end of the movable valve member 12 while actuator 22 is positioned adjacent the opposite end of the movable valve member 12. By locating the floating pin 16 on the side of the movable valve member opposite the actuator 22, the space available for other valve and actuator components is increased thus allowing for a simpler, less intricate connection between the actuator 22 and movable valve member 12, while providing a fast response, compact valve assembly capable of effectively handling high pressure fluids. Moreover, this design permits a readily available "off-the-shelf" actuator assembly to be easily adapted for use with the valve assembly.

Industrial Applicability

As discussed hereinabove, the three-way valve of the present invention may be readily adapted to control the flow of air, hydraulic fluid or fuel in a variety of known pneumatic, hydraulic and fuel systems where high pressure fluid is being supplied to a load device. This load device may be a pneumatic or hydraulic cylinder or may be one or more fuel injectors of an internal combustion engine.

What is claimed is:

1. A three-way valve assembly, comprising:

a valve housing containing a valve chamber and first, second and third valve passages communicating with said valve chamber;

a movable valve member mounted for reciprocal movement within said valve chamber between first and second positions, said movable valve member including a first end and a second end spaced axially along said movable valve member from said first end and a cavity opening into said second end;

a stop means positioned adjacent said second end of said movable valve member for defining one of said first and second positions of said movable valve member, said stop means including a floating pin arranged to be telescopingly received within said cavity of said movable valve member adjacent said second end;

a first valve seat associated with said valve housing and movable valve member and positioned between said first and second ends of said movable valve member, said first valve seat being formed between said valve housing and said movable valve member, said first valve seat being positioned to be closed when said movable valve member is in said first position to seal said third valve passage from the said first and second valve passages and allow fluid communication between said first and second valve passage through said valve chamber;

a second valve seat associated with said valve housing and said movable valve member and positioned between said first and said second ends of said movable valve member, said second valve seat being formed between said movable valve member and said floating pin, said second valve seat being positioned to be closed when said movable valve member is in said second position to seal said second valve passage from said first and third valve passages and allow fluid communication between said first and third valve passages; and an actuating means for advancing said movable valve member toward said first position when energized and for allowing said movable valve member to retract to said second position when de-energized, said actuating means positioned adjacent said first end of said movable member.

2. A valve assembly as defined in claim 1, wherein said stop means includes a movement limiting means adjacent an end thereof remote from said second valve seat, said movement limiting means including a retraction stop for arresting retraction of said floating pin and said movable valve member to define said second position of said movable valve member in which said second valve seat is closed.

3. A valve assembly as defined in claim 2, wherein said movable valve member is drawn in a direction away from said second valve seat when said actuating means is energized.

4. A valve assembly as defined in claim 3, wherein said floating pin has a sufficiently close sliding fit with the inside surface of said cavity of said movable valve member to form a fluid seal, said movable valve member containing an inner annular recess at one end of said cavity adjacent said second valve seat, said valve housing containing a first outer annular recess communicating with said valve chamber and axially positioned adjacent said first valve seat and a second outer annular recess communicating with said valve chamber and axially positioned adjacent said inner annular recess when said movable valve member is located in its second position, said first and second outer annular recesses being fluidically connected by a first radial passage contained in said movable valve member extending between said movable valve member cavity and said first outer annular recess, said movable valve member cavity, said second valve seat, said inner annular recess and a second radial passage extending between said movable valve member cavity and said second outer recess, wherein said movable valve member has a sufficiently close sliding fit with the inside surface of said valve chamber to form a fluid seal along substantially the entire length of said movable valve member extending between said first and second outer annular recesses and extending beyond said second outer annular recess to seal said second outer annular recess against fluid leakage between said valve housing and said movable valve member.

5. A valve assembly as defined in claim 4, wherein said first valve passage is connected with said first annular outer recess to form a passage for fluid flowing from said valve assembly and said second valve passage is connected with said second annular outer recess to form a passage for supplying fluid under relatively high pressure to said valve assembly and wherein said cavity contained within said movable valve member extends from said second valve seat to a location axially aligned with the first annular outer recess, whereby a fluid flow path is formed when said movable valve member is in its first position, from said second valve passage to said first valve passage through said second outer annular recess, said second radial passage, said second valve seat, said movable valve member cavity, and said first radial passage, wherein said third valve passage is connected with said valve chamber for draining fluid at a low pressure from said valve chamber at a location axially spaced from said first annular outer recess in a direction away from said second annular outer recess and fluidically connected with said first outer annular recess through said first valve seat when said movable valve member is in its second position, said third valve passage being fluidically isolated from said first outer annular recess when said movable valve member is in its first position.

* * * * *